UNITED STATES PATENT OFFICE.

FRANK G. CURTIS, OF PHILADELPHIA, PENNSYLVANIA, ASSIGNOR TO J. BOARDMAN CANN, OF BOSTON, AND FREDERICK D. GOODE, OF NEWTON, MASSACHUSETTS.

COMPOSITION FOR EXCITING FLUIDS FOR ELECTRICAL BATTERIES.

SPECIFICATION forming part of Letters Patent No. 561,204, dated June 2, 1896.

Application filed February 13, 1893. Renewed November 14, 1895. Serial No. 568,978. (No specimens.)

*To all whom it may concern:*

Be it known that I, FRANK G. CURTIS, a citizen of the United States, residing at Philadelphia, in the county of Philadelphia and State of Pennsylvania, have invented certain new and useful Improvements in Compositions for Exciting Fluids for Electrical Batteries; and I do declare the following to be a full, clear, and exact description of the invention, such as will enable others skilled in the art to which it appertains to make and use the same.

My invention has for its object to provide certain new and useful improvements in fluids for primary batteries, the pole-pieces being by preference zinc and carbon, though it is evident that other substances may be used.

This invention has for its object more specifically to provide a fluid that may be used in the well-known form of Bunsen battery and which will give therein a more or less constant current with a small consumption of zinc and without the production of undesirable gases. For these purposes it consists in the composition of matter that will be hereinafter more fully described and claimed.

This invention relates more especially to a solution in which the zinc or its equivalent is immersed, and this solution is prepared as follows:

A saturated solution in water is prepared, in separate vessels, of the following: first, one-fourth of a pound of acetate of lead and five pounds of hyposulfite of soda, with water sufficient to dissolve; second, two pounds of sulfuric acid is diluted with one quart of water; third, five pounds of sulfate of aluminium is dissolved in sufficient water. The second and third of the above solutions are mixed and allowed to cool. The first solution is then poured into the above mixture, and having been thoroughly stirred the solution is filtered. To this filtrate is added sixteen pounds (one gallon) of sulfuric acid, and the solution thus formed is diluted for use with water in proportions of one part of solution to twelve parts of water and in this state is adapted to receive the negative pole of a battery; but it is evident that for convenience of transportation the twelve parts of water need not be added until the solution is poured into the cells, and I do not, therefore, desire to limit my invention in this respect.

By preference I use a solution for the positive pole, which is prepared as follows, I having found that it gives the best results with the negative solution heretofore described: I prepare in a separate vessel a concentrated solution in water of five pounds of oxalic acid and one-half pound of nitrate of ammonium and mix the two. I then dilute one hundred and fifty pounds of nitric acid with two hundred pounds of water, to which I add the solution of oxalic acid and nitrate of ammonium.

As in practice it will be found that the solution for the positive element will retain its vigor for twice the length of time of the solution of the negative one, the negative solution may be renewed twice to a single renewal of the positive solution.

Having thus described my invention, what I claim, and desire to secure by Letters Patent, is—

1. As a new composition of matter, the hereinbefore-described solution for primary batteries, in which the negative element is immersed, consisting of a solution of sulfate of aluminium, acetate of lead, hyposulfite of soda, and sulfuric acid in the proportions specified.

2. The hereinbefore-described solution for primary batteries, in which the positive element is immersed, consisting of a solution of oxalic acid, nitrate of ammonia, and nitric acid as before specified.

In testimony whereof I affix my signature in presence of two witnesses.

FRANK G. CURTIS.

Witnesses:
C. MATHER,
CHARLES RICHARDSON.